US012779671B2

(12) United States Patent
Kuan et al.

(10) Patent No.: US 12,779,671 B2
(45) Date of Patent: Nov. 3, 2026

(54) METHOD FOR DETERMINING EXTERNAL FORCE APPLIED TO ROBOTIC ARM, ROBOTIC ARM AND STORAGE MEDIUM

(71) Applicants: SHANGHAI FLEXIV ROBOTICS TECHNOLOGY CO., LTD., Shanghai (CN); FLEXIV LTD., Grand Cayman (GB)

(72) Inventors: Chi-Tao Kuan, Santa Clara, CA (US); Shuhan Li, Santa Clara, CA (US); Hao Jiang, Santa Clara, CA (US)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 180 days.

(21) Appl. No.: 18/564,414

(22) PCT Filed: Feb. 20, 2023

(86) PCT No.: PCT/CN2023/077146

§ 371 (c)(1),
(2) Date: Nov. 27, 2023

(87) PCT Pub. No.: WO2024/174060

PCT Pub. Date: Aug. 29, 2024

(65) Prior Publication Data

US 2026/0115901 A1 Apr. 30, 2026

(51) Int. Cl.
*B25J 9/16* (2006.01)
*B25J 13/08* (2006.01)

(52) U.S. Cl.
CPC .......... *B25J 9/1607* (2013.01); *B25J 9/1653* (2013.01); *B25J 13/085* (2013.01)

(58) Field of Classification Search
CPC ...... B25J 9/1607; B25J 9/1653; B25J 13/085; B25J 9/1638; B25J 9/1641; B25J 17/00;
(Continued)

(56) References Cited

U.S. PATENT DOCUMENTS

| | | | | |
|---|---|---|---|---|
| 2011/0060460 A1 | 3/2011 | Oga et al. | | |
| 2011/0160906 A1* | 6/2011 | Orita | .................. | B62D 57/032 901/1 |

(Continued)

FOREIGN PATENT DOCUMENTS

| | | | |
|---|---|---|---|
| CN | 108789363 A | 11/2018 | |
| CN | 109141917 A | 1/2019 | |

(Continued)

OTHER PUBLICATIONS

J. Vorndamme, M. Schappler and S. Haddadin, "Collision detection, isolation and identification for humanoids," 2017 IEEE International Conference on Robotics and Automation (ICRA), Singapore, 2017, pp. 4754-4761, doi: 10.1109/ICRA.2017.7989552. (Year: 2017).*

(Continued)

*Primary Examiner* — Adam R Mott
*Assistant Examiner* — James Miller Watts, III
(74) *Attorney, Agent, or Firm* — Dority & Manning, PA

(57) ABSTRACT

A method for determining an external force applied to a robotic arm, wherein the robotic arm includes a plurality of links, a plurality of joints and a plurality of 6-DOF force and torque sensors. In the method, inertial property parameters and motion state parameters of each link are determined. An inertial force and an inertial torque at the center of mass of a target link are determined. Forces and torques between the two ends of the target link and the corresponding joints are acquired respectively by the 6-DOF force and torque sensors. The external force applied to the target link is deter-
(Continued)

mined according to the inertial force and the inertial torque at the center of mass of the target link, and the forces and the torques between the two ends of the target link and the corresponding joints.

14 Claims, 4 Drawing Sheets

(58) Field of Classification Search
CPC . B25J 19/02; B25J 18/00; B25J 9/1694; B25J 15/022; B25J 9/16; G05B 2219/39412; G05B 2219/40599; H02P 21/143; H02P 21/20; G01L 5/16; G01L 5/009; G01L 5/0061
See application file for complete search history.

(56) References Cited

U.S. PATENT DOCUMENTS

| | | | | |
|---|---|---|---|---|
| 2021/0060793 | A1* | 3/2021 | Wang | B25J 9/06 |
| 2022/0019196 | A1 | 1/2022 | Wang et al. | |
| 2022/0416701 | A1* | 12/2022 | Takahashi | H02P 21/143 |

FOREIGN PATENT DOCUMENTS

| | | | | | |
|---|---|---|---|---|---|
| CN | 110450154 | A | | 11/2019 | |
| CN | 111683796 | A | | 9/2020 | |
| CN | 112199827 | A | | 1/2021 | |
| CN | 112847345 | | | 5/2021 | |
| CN | 114516052 | | | 5/2022 | |
| CN | 115157260 | A | | 10/2022 | |
| CN | 115622461 | | | 1/2023 | |
| DE | 102021113636 | B3 | * | 11/2022 | B25J 9/1674 |
| EP | 4094903 | | | 11/2022 | |
| JP | 2008006517 | | | 1/2008 | |
| JP | 2008006517 | A | | 1/2008 | |
| JP | 2011056601 | A | | 3/2011 | |
| JP | 2013086259 | A | | 5/2013 | |
| JP | 2020037172 | | | 3/2020 | |
| JP | 2020037172 | A | * | 3/2020 | |
| KR | 20180053482 | | | 5/2018 | |
| WO | WO 2021147266 | A1 | | 7/2021 | |

OTHER PUBLICATIONS

Â¢ G. Buondonno and A. De Luca, "Combining real and virtual sensors for measuring interaction forces and moments acting on a robot," 2016 IEEE/RSJ International Conference on Intelligent Robots and Systems (IROS), Daejeon, Korea (South), 2016 (Year: 2016).*

Translation of DE-102021113636-B3 (Year: 2022).*

Translation of JP-2020037122-A (Year: 2020).*

Owen, S. (Nov. 27, 2018). Vectors, Matrices, and Linear Algebra. Retrieved from https://web.archive.org/web/20181127221430/https://web.stanford.edu/class/nbio228-01/handouts/Ch4_Linear_Algebra.pdf (Year: 2018).*

Anonymous. (Aug. 30, 2017). Rigid Bodies; Equivalent Systems of forces. Retrieved from https://web.archive.org/web/20170830055029/https://engineering.purdue.edu/~aprakas/CE297/CE297-Ch3.pdf (Year: 2017).*

PCT International Search Report and Written Opinion for corresponding PCT Application No. PCT/CN2023/077146, mailed on Oct. 19, 2023, 8 pages.

Office Action received in corresponding Application No. CN 202310143703.9, dated Jul. 31, 2025, 7 pages.

Li, "Analysis and simulation of knee angulation force model for breakthrough in basketball sports", English abstract only, Modern Electronics Technique, vol. 40, No. 7, Apr. 2017, 4 pages.

Buondonno et al, "Combining Real and Virtual Sensors for Measuring Interaction Forces and Moments Acting on a Robot", International Conference on Intelligent Robots and Systems, Daejeon, Republic of Korea, Oct. 9-14, 2016, 7 pages.

Birjandi et al, "Observer-Extended Direct Method for Collision Monitoring in Robot Manipulators Using Proprioception and IMU Sensing", Robotics and Automation Letters, vol. 5, No. 2, Apr. 2020, 8 pages.

Liljebäck et al, "Mamba—A Waterproof Snake Robot with Tactile Sensing", International Conference on Intelligent Robots and Systems, Chicago, IL, United States, Sep. 14-18, 2014, 8 pages.

Haddadin et al, "Robot Collisions: A Survey on Detection, Isolation, and Identification", Transactions on Robotics, vol. 33, No. 6, Dec. 2017, 21 pages.

Extended European Search Report received in corresponding Application No. EP 23923246.5, dated Mar. 16, 2026, 14 pages.

Notice of Allowance received in corresponding Application No. CN 202310143703.9, dated Mar. 30, 2026, 4 pages.

* cited by examiner

METHOD FOR DETERMINING EXTERNAL FORCE APPLIED TO ROBOTIC ARM, ROBOTIC ARM AND STORAGE MEDIUM

CROSS-REFERENCE TO RELATED DISCLOSURES

This application is a national stage application of PCT international application PCT/CN2023/077146 filed on Feb. 20, 2023, entitled "METHOD FOR DETERMINING EXTERNAL FORCE APPLIED TO ROBOTIC ARM, ROBOTIC ARM AND STORAGE MEDIUM", the entire contents of which are incorporated by reference.

TECHNICAL FIELD

The present disclosure relates to the robotic technology, and in particular, to a method for determining an external force applied to a robotic arm, a robotic arm, and a storage medium.

BACKGROUND

At present, robotic arms are widely used in various fields such as industrial manufacturing, logistics and transportation, etc. Due to the complex external environment, the robotic arms are inevitably impacted by external forces during operation. If the external forces cannot be accurately detected, the robotic arms will not be able to respond to the external forces such as collision, thus affecting the operation of the robotic arms. Therefore, how to accurately detect the external forces applied to the robotic arms is very important for the robotic arms.

SUMMARY

In a first aspect, the present disclosure provides a method for determining an external force applied to a robotic arm. The robotic arm includes a plurality of links connected in sequence and a plurality of joints. The links are connected by the joints. A six degrees of freedom (6-DOF) force and torque sensor is mounted on the joint at each end of at least part of the links. The 6-DOF force and torque sensor is configured to detect forces and torques applied to the corresponding joint. The method includes the following steps. Inertial property parameters of each link are acquired, and the inertial property parameters include a mass, a center of mass, and a rotational inertia of each link. Motion state parameters of each link are determined, and the motion state parameters include an angular velocity, an angular acceleration, and a linear acceleration of each link. An inertial force and an inertial torque at the center of mass of a target link are determined according to the motion state parameters and the inertial property parameters of each link. Forces and torques between two ends of the target link and the corresponding joints are acquired respectively by the 6-DOF force and torque sensors. An external force applied to the target link is determined according to the inertial force and the inertial torque at the center of mass of the target link, and the forces and the torques between the two ends of the target link and the corresponding joints.

In some embodiments, determining the motion state parameters of each link includes the following steps. Connection parameters of each joint and angular information of each joint are acquired. The connection parameters represent a spatial position relationship of two adjacent links. The angular information of each joint includes a joint angular position, a joint angular velocity, and a joint angular acceleration. According to the inertial property parameters of each link, the connection parameters of each joint, and the angular information of each joint, the motion state parameters of each link are determined using a robot dynamics principle.

In some embodiments, an inertial measurement unit is mounted on each of the links for measuring the angular velocity, the angular acceleration, and the linear acceleration of the corresponding link. Determining the motion state parameters of each link includes: obtaining the motion state parameters of each link from the inertial measurement units.

In some embodiments, determining the inertial force and the inertial torque at the center of mass of the target link according to the motion state parameters and the inertial property parameters of each link includes: determining the inertial force and the inertial torque at the center of mass of the target link according to the motion state parameters and the inertial property parameters of each link by using backward recursive equations of Recursive Newton-Euler equations.

In some embodiments, determining the external force applied to the target link according to the inertial force and the inertial torque at the center of mass of the target link, and the forces and the torques between the two ends of the target link and the corresponding joints includes: determining a first difference between the inertial force at the center of mass of the target link and the forces between the two ends of the target link and the corresponding joints, and determining a magnitude and a direction of the external force applied to the target link according to the first difference.

In some embodiments, the method further includes: determining a net torque of the target link at a reference point according to a second difference between the torques between the two ends of the target link and the corresponding joints and the inertial torque of the target link at the center of mass, and determining a location of the external force applied to the target link relative to the reference point according to the net torque of the target link at the reference point and the magnitude and the direction of the external force applied to the target link.

In some embodiments, before determining the location of the external force applied to the target link relative to the reference point according to the net torque of the target link at the reference point and the magnitude and the direction of the external force applied to the target link, the method further includes the following steps. It is determined that whether the magnitude of the external force is greater than a predetermined first threshold value, and determining whether a value of the net torque is greater than a predetermined second threshold value. It is determined that there is no external force applied to the target link if the magnitude of the external force is less than the first threshold value. It is determined that the external force applied to the target link is located at the reference point if the magnitude of the external force is greater than or equal to the first threshold value and the value of the net torque is less than the second threshold value.

In some embodiments, the method further includes: determining the location of the external force applied to the target link relative to the reference point according to following equations if the magnitude of the external force is greater than or equal to the first threshold value and the value of the net torque is greater than the second threshold:

$$r_{mag} = \frac{\|M\|}{\|F\|}$$

$$r_{vec} = r_{mag}\frac{F \times M}{\|F \times M\|}$$

wherein $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

In a second aspect, the present disclosure provides a robotic arm. The robotic arm includes: a plurality of links connected in sequence, a plurality of joints, a plurality of 6-DOF force and torque sensors, at least one memory and at least one processor. The links are connected by the joints. The 6-DOF force and torque sensors are mounted on the joints at two ends of at least part of the links. The 6-DOF force and torque sensors are configured to detect forces and torques applied to corresponding joints. The at least one memory stores computer program instructions. When the computer program instructions are executed by the at least one processor, following steps are implemented. Inertial property parameters of each link are acquired, and the inertial property parameters include a mass, a center of mass, and a rotational inertia of each link. Motion state parameters of each link are determined, and the motion state parameters include an angular velocity, an angular acceleration, and a linear acceleration of each link. An inertial force and an inertial torque at the center of mass of a target link are determined according to the motion state parameters and the inertial property parameters of each link. Forces and torques between two ends of the target link and the corresponding joints are acquired respectively by the 6-DOF force and torque sensors. An external force applied to the target link is determined according to the inertial force and the inertial torque at the center of mass of the target link, and the forces and the torques between the two ends of the target link and the corresponding joints.

In some embodiments, determining the motion state parameters of each link includes the following steps. Connection parameters of each joint and angular information of each joint are acquired. The connection parameters represent a spatial position relationship of two adjacent links. The angular information of each joint includes a joint angular position, a joint angular velocity, and a joint angular acceleration. According to the inertial property parameters of each link, the connection parameters of each joint, and the angular information of each joint, the motion state parameters of each link are determined using a robot dynamics principle.

In some embodiments, an inertial measurement unit is mounted on each of the links for measuring the angular velocity, the angular acceleration, and the linear acceleration of the corresponding link. Determining the motion state parameters of each link includes: obtaining the motion state parameters of each link from the inertial measurement units.

In some embodiments, determining the inertial force and the inertial torque at the center of mass of the target link according to the motion state parameters and the inertial property parameters of each link includes: determining the inertial force and the inertial torque at the center of mass of the target link according to the motion state parameters and the inertial property parameters of each link by using backward recursive equations of Recursive Newton-Euler equations.

In some embodiments, determining the external force applied to the target link according to the inertial force and the inertial torque at the center of mass of the target link, and the forces and the torques between the two ends of the target link and the corresponding joints includes: determining a first difference between the inertial force at the center of mass of the target link and the forces between the two ends of the target link and the corresponding joints, and determining a magnitude and a direction of the external force applied to the target link according to the first difference.

In some embodiments, the steps further includes: determining a net torque of the target link at a reference point according to a second difference between the torques between the two ends of the target link and the corresponding joints and the inertial torque of the target link at the center of mass, and determining a location of the external force applied to the target link relative to the reference point according to the net torque of the target link at the reference point and the magnitude and the direction of the external force applied to the target link.

In some embodiments, before determining the location of the external force applied to the target link relative to the reference point according to the net torque of the target link at the reference point and the magnitude and the direction of the external force applied to the target link, the steps further include the following. It is determined that whether the magnitude of the external force is greater than a predetermined first threshold value, and determining whether a value of the net torque is greater than a predetermined second threshold value. It is determined that there is no external force applied to the target link if the magnitude of the external force is less than the first threshold value. It is determined that the external force applied to the target link is located at the reference point if the magnitude of the external force is greater than or equal to the first threshold value and the value of the net torque is less than the second threshold value.

In some embodiments, the steps further include: determining the location of the external force applied to the target link relative to the reference point according to following equations if the magnitude of the external force is greater than or equal to the first threshold value and the value of the net torque is greater than the second threshold:

$$r_{mag} = \frac{\|M\|}{\|F\|}$$

$$r_{vec} = r_{mag}\frac{F \times M}{\|F \times M\|}$$

wherein $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

In a third aspect, the present disclosure provides a non-transitory computer-readable storage medium, on which a computer program is stored. When the computer program is executed by at least one processor, following steps are implemented. Inertial property parameters of each link are acquired, and the inertial property parameters include a mass, a center of mass, and a rotational inertia of each link. Motion state parameters of each link are determined, and the motion state parameters include an angular velocity, an angular acceleration, and a linear acceleration of each link. An inertial force and an inertial torque at the center of mass of a target link are determined according to the motion state parameters and the inertial property parameters of each link. Forces and torques between two ends of the target link and the corresponding joints are acquired respectively by the 6-DOF force and torque sensors. An external force applied to the target link is determined according to the inertial force and the inertial torque at the center of mass of the target link, and the forces and the torques between the two ends of the target link and the corresponding joints.

In some embodiments, determining the motion state parameters of each link includes the following steps. Connection parameters of each joint and angular information of each joint are acquired. The connection parameters represent a spatial position relationship of two adjacent links. The angular information of each joint includes a joint angular position, a joint angular velocity, and a joint angular acceleration. According to the inertial property parameters of each link, the connection parameters of each joint, and the angular information of each joint, the motion state parameters of each link are determined using a robot dynamics principle.

In some embodiments, determining the external force applied to the target link according to the inertial force and the inertial torque at the center of mass of the target link, and the forces and the torques between the two ends of the target link and the corresponding joints includes: determining a first difference between the inertial force at the center of mass of the target link and the forces between the two ends of the target link and the corresponding joints, and determining a magnitude and a direction of the external force applied to the target link according to the first difference.

In some embodiments, when the computer program is executed by the at least one processor, following steps are further implemented: determining a net torque of the target link at a reference point according to a second difference between the torques between the two ends of the target link and the corresponding joints and the inertial torque of the target link at the center of mass, and determining a location of the external force applied to the target link relative to the reference point according to the net torque of the target link at the reference point, and the magnitude and the direction of the external force applied to the target link.

The above description is only an overview of the technical solution of the present disclosure. In order to understand the technical solution of the present disclosure more clearly, so as to implement the technical solution in accordance with contents of the specification, and in order to make the above and other purposes, features and advantages of this disclosure more obvious and easier to understand, the following specific embodiments of the present disclosure are given below.

BRIEF DESCRIPTION OF THE DRAWINGS

In order to illustrate the technical solutions in the embodiments of the present application or the related technology more clearly, the accompanying drawings used in the description of the embodiments or the related technology will be briefly introduced below. Apparently, the accompanying drawings in the following description are only some embodiments of the present disclosure. For those of ordinary skill in the art, other drawings can also be derived from these drawings without creative effort.

DETAILED DESCRIPTION OF THE EMBODIMENTS

Figure 1:
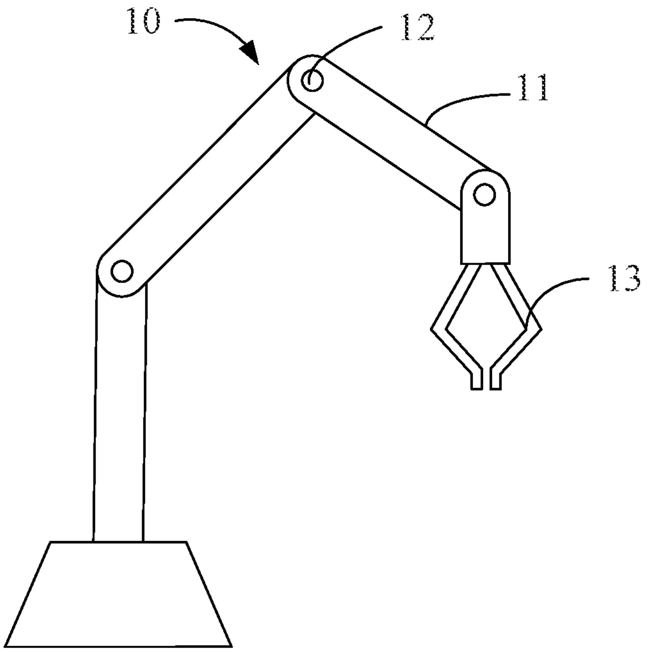
FIG. 1 is a schematic diagram of a structure of a robotic arm according to an embodiment of the preset disclosure.

Embodiments of the present disclosure will be described in detail below with reference to the accompanying drawings. The embodiments described herein are only used to illustrate the technical solutions of the present disclosure more clearly. Therefore, the embodiments are only used as examples, but not to limit the scope of the present disclosure.

Unless otherwise defined, all technical and scientific terms used herein have the same meaning as commonly understood by one of ordinary skill in the art to which this disclosure belongs. The terms herein are only used to illustrate the specific embodiments, but are not intended to limit the disclosure. The terms "include", "have" and any variations in the specification, the claims, and the description of the drawings of the present disclosure are intended to cover non-exclusive inclusion.

In the description of the embodiments of the present disclosure, the terms "first", "second", etc. are used only to distinguish different objects, but cannot be construed as indicating or implying the relative importance or implicitly indicating the number, the particular order or the priority of the indicated technical features. In the description of the embodiments of the present disclosure, the term "plurality" means more than two (including two), unless otherwise specifically limited.

In the description of the embodiments of the present disclosure, unless otherwise defined, the technical terms "mounted", "connected", "fixed", etc. should be understood in a broad sense, e.g., it may be a fixed connection, a removable connection, or integrated. It may also be a mechanical connection or an electrical connection. It may also be a direct connection or an indirect connection through an intermediate medium. It may also be an internal connection of two components or an interaction between two components. To those of ordinary skill in the art, the specific meaning of the above terms in the embodiments of the present disclosure can be understood according to specific conditions.

At present, robotic arms are widely used in various fields such as industrial manufacturing, logistics and transportation, etc. Due to the complex external environment, the robotic arms are inevitably impacted by external forces during operation. Therefore, it is very important for the robotic arms to detect the external forces applied thereto, so that the robotic arms can react accordingly to the external forces. However, the applicants have noted that most of the current robotic arms are only capable of determining the position of the external forces, but cannot determine the magnitude, the direction and the location of the external forces applied to the robotic arms. Even if a one degree of freedom (1-DOF) force and torque sensor is mounted on each joint of a robotic arm, or a 6-DOF force and torque sensor is mounted on an end effector of the robotic arm, it can only simply determine the external force applied to the robotic arm as a whole, and cannot accurately determine the external forces applied to each link of the robotic arm and the specific location of the external forces.

The applicants have designed a method for determining the external force applied to the robotic arm after research. The robotic arm includes a plurality of links connected in sequence and a plurality of joints. The links are connected by the joints. A 6-DOF force and torque sensor is mounted on each joint at each end of at least part of the links. The 6-DOF force and torque sensor is configured to detect the force and the torque applied to the corresponding joint. The method for determining the external force applied to the robotic arm includes the following steps. Inertial property parameters of each link are acquired. The inertial property parameters include a mass, a center of mass, and a rotational inertia of each link. Motion state parameters of each link are determined. The motion state parameters include an angular velocity, an angular acceleration, and a linear acceleration of each link. An inertial force and an inertial torque at the center of mass of a target link are determined according to the motion state parameters and the inertial property parameters of each link. Forces and torques between the two ends of the target link and the corresponding joints are acquired respectively by the 6-DOF force and torque sensors. The external force applied to the target link is determined according to the inertial force and the inertial torque at the center of mass of the target link, and the forces and the torques between the two ends of the target link and the corresponding joints.

By mounting the 6-DOF force and torque sensors on the joints at both ends of the links of the robotic arm, the forces on the joints of the robotic arm in each direction can be determined. The magnitude, the direction and the location of the external force applied to each link of the robotic arm can also be determined respectively. Therefore, the external force applied to the robotic arm can be calculated more accurately.

The concept of the present disclosure will be described in detail as follows in conjunction with the embodiments. The method for determining the external force applied to the robotic arm provided in each embodiment of the present disclosure can be applied to, but is not limited to, the robotic arms in the fields such as industrial manufacturing, logistics and transportation, etc.

FIG. 1 is a schematic diagram of a structure of the robotic arm according to an embodiment. The robotic arm 10 includes a plurality of links 11 connected in sequence, a plurality of joints 12, and an operating portion 13. The links 11 are connected by the joints 12. In some embodiments, the links 11 are rotatably connected by the joints 12. In some other embodiments, part of the links 11 may be connected by the joints 11 in a linearly driven manner. The operating portion 13 may be a component such as a gripper for implementing a corresponding function of the robotic arm. Also referring to FIG. 2, a 6-DOF force and torque sensor 14 is mounted on the joint 12 at each end of at least part of the links 11. The 6-DOF force and torque sensor 14 is configured to detect the forces and the torques applied to the corresponding joint. For example, in some cases, each link of the robotic arm may be affected by the external force, i.e., the external force applied to each link needs to be calculated, so the joints at ends of each link are each provided with the 6-DOF force and torque sensor 14. In some other cases, the external force applied to part of the links of the robotic arm needs to be calculated, or part of the links may be considered as a whole when calculating the external force, then the joint at each end of the part of the links is provided with the 6-DOF force and torque sensor. In other words, it's possible to determine the link at ends of which the 6-DOF force and torque sensor needs to be amounted, according to actual needs. The arrangement of the 6-DOF force and torque sensors is not limited in the present disclosure.

The 6-DOF force and torque sensor 14 is capable of detecting the forces and the torques (Fx, Fy, Fz, Tx, Ty, Tz) on the joint in three directions in a three-dimensional space.

It should be understood that in the embodiments of the disclosure, the quantity of the links 11 and the joints 12 of the robotic arm 10 may be set as needed. For example, if the robotic arm 10 is a seven-axis robot, the robotic arm 10 may include seven joints 12 and the corresponding number of the links 11.

In some embodiments, the 6-DOF force and torque sensor 14 may be mounted on an input side of the corresponding joint 12. In other embodiments, the 6-DOF force and torque sensor 14 may be mounted on an output side of the corresponding joint 12. It should be understood by those skilled in the art that for the method for determining the external force applied to the robotic arm, a difference between mounting a 6-DOF force and torque sensor 14 on the output side of the joint and mounting a 6-DOF force and torque sensor 14 on the input side of the joint is that a magnification or a reduction of the forces and the torques caused by a reducer in some directions needs to be considered, i.e., the magnitude of the forces and the torques may be different in some directions in the calculation of the external force applied to the robotic arm, and the reference coordinate systems used in the subsequent data processing and the calculation of the external force applied to the robotic arm are different, but the principle of the method for calculating the external force applied to the robotic arm is the same. Both settings of mounting the 6-DOF force and torque sensor 14 on the input side and the output side of the joint are possible for the method of the present disclosure.

In some embodiments, the 6-DOF force and torque sensor 14 may be mounted on each of the joints 12. In other embodiments, as needed, the 6-DOF force and torque sensors 14 may be mounted on the joints at two ends of the target link that need detection of the external force, instead of all joints. The arrangement of the 6-DOF force and torque sensors can be determined according to the actual needs.

Figure 2:
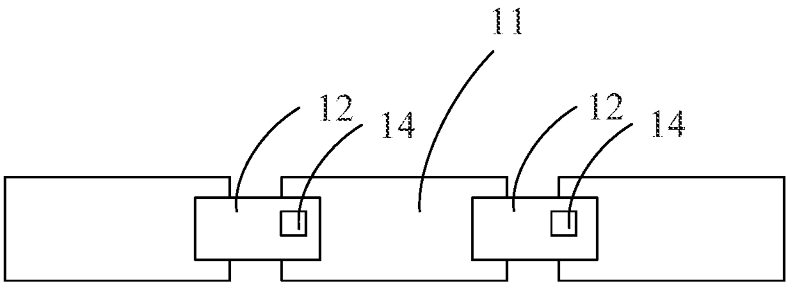
FIG. 2 is an equivalent schematic diagram of a connection structure between links of a robotic arm according to an embodiment of the present disclosure.
Figure 3:
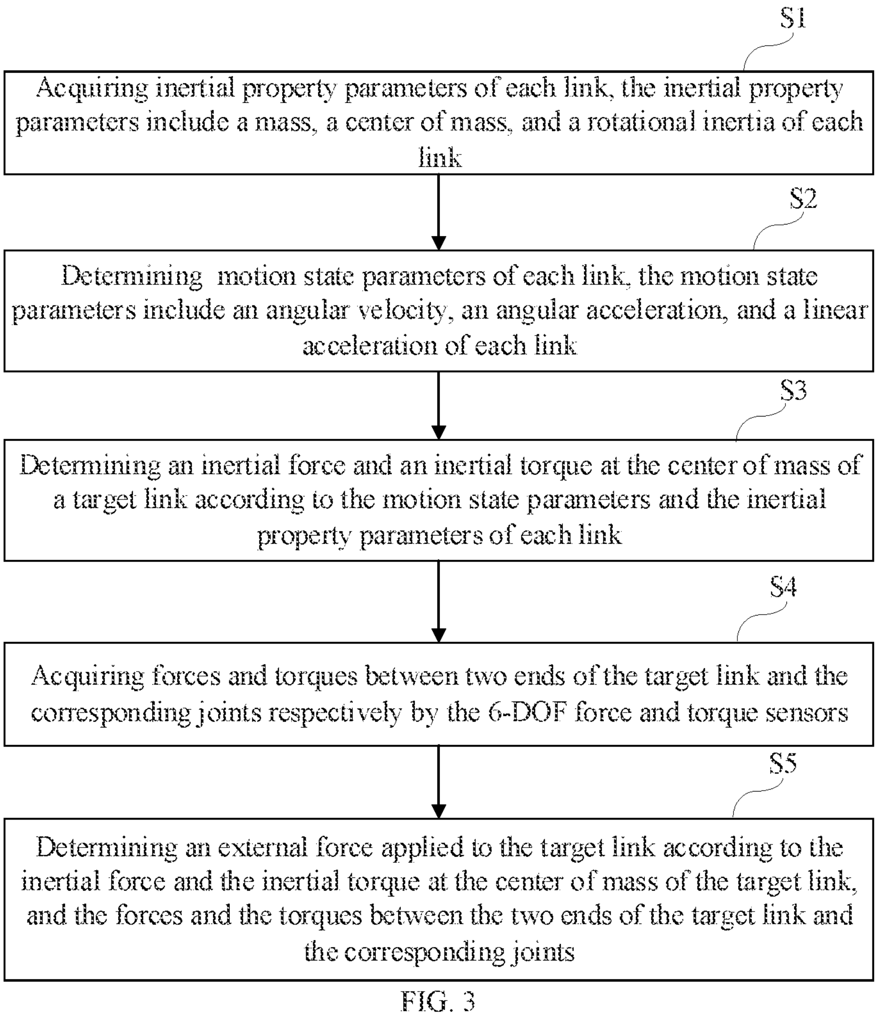
FIG. 3 is a flowchart of a method for determining an external force applied to a robotic arm according to an embodiment of the present disclosure.

FIG. 3 is a flowchart of a method for determining the external force applied to the robotic arm according to an embodiment of the present disclosure. In this exemplary embodiment, the method for determining the external force applied to the robotic arm is implemented in the robotic arm as shown in FIGS. 1-2. The method includes the following steps S1 to S5.

At step S1, inertial property parameters of each link are acquired. The inertial property parameters include a mass, a center of mass, and a rotational inertia of each link.

In some embodiments, the robot having the robotic arm 10 further includes a controller (not shown in the drawings). The controller stores data for describing the structure of the robot, such as a Unified Robot Description Format (URDF)

file. The URDF is a format based on the XML specification for describing the structure of the robot. In the mechanics perspective, a robot is usually modeled as a structure consisting of links and joints. Each link is a rigid body with mass properties, and each joint is a structure that connects and limits the relative motion of two rigid bodies. The links are connected in sequence by the joints, thus multiple kinematic chains are formed (i.e., a robot model obtained by modeling). The URDF file is configured to describe a relationship between a series of joints and links of the robot, and the inertial properties, etc.

The inertial property parameters of each link may be acquired form the URDF file.

In other embodiments, the inertial property parameters of each link may be acquired from other external storage device.

At step S2, motion state parameters of each link are determined. The motion state parameters include an angular velocity, an angular acceleration, and a linear acceleration of each link.

In some embodiments, an inertial measurement unit (IMU) is mounted on each of the links for measuring the angular velocity, the angular acceleration, and the linear acceleration of the corresponding link. The step of determining the motion state parameters of each link includes: obtaining the motion state parameters of each link from the inertial measurement units.

Figure 4:
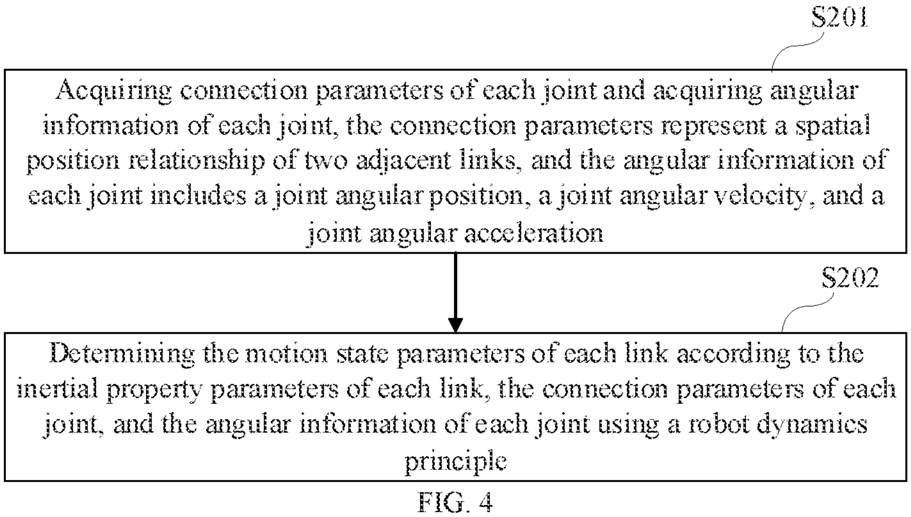
FIG. 4 is a flowchart of a method for determining motion parameters of each link according to an embodiment of the present disclosure.

In some other embodiments, as shown in FIG. 4, determining the motion state parameters of each link may include the following steps S201 and S202.

At step S201, connection parameters of each joint and angular information of each joint are acquired. The connection parameters represent a spatial position relationship of two adjacent links. The angular information of each joint includes a joint angular position, a joint angular velocity, and a joint angular acceleration.

In some embodiments, the connection parameters of each link may be acquired from the URDF file, or acquired from other external storage device. The method for acquiring the connection parameters is not limited in the present disclosure.

In some embodiments, the connection parameters may be standard Denavit-Hartenberg (D-H) parameters. The D-H parameters describe the spatial position relationship between two adjacent links by setting a coordinate system for each link of the robot, and using a 4×4 chi-square transformation matrix. The D-H parameters include the following four parameters: a length of the link, a twist angle of the link, an offset distance of the link, and a joint angle. The D-H parameters are known and will not be described in detail herein.

In some other embodiments, the connection parameters may be improved D-H parameters. The improved D-H parameters are known and will not be described in detail herein.

In some embodiments, a joint position sensor (not shown in the drawings) is mounted on each of the joints 12 for sensing the angular information such as the joint angular position, the joint angular velocity, and the joint angular acceleration of the corresponding joint, etc. For example, the joint position sensor may be a joint encoder. The angular information of each joint may be acquired from the joint position sensor.

At step S202, according to the inertial property parameters of each link, the connection parameters of each joint, and the angular information of each joint, the motion state parameters of each link are determined using the robot dynamics principle.

The robot dynamics principle includes, but is not limited to, the Lagrange Method, the Recursive Newton-Euler Algorithm, etc.

According to the above description, there are various methods to determine the motion state parameters of each link using the robot dynamics principle. In this embodiment, the robot dynamics principle is described by taking the Recursive Newton-Euler Algorithm as an example. In this embodiment, the motion state parameters of each link are determined by using forward recursive equations of the Recursive Newton-Euler Algorithm according to the inertial property parameters of each link, the connection parameters of each joint, and the angular information of each joint.

Figure 5:
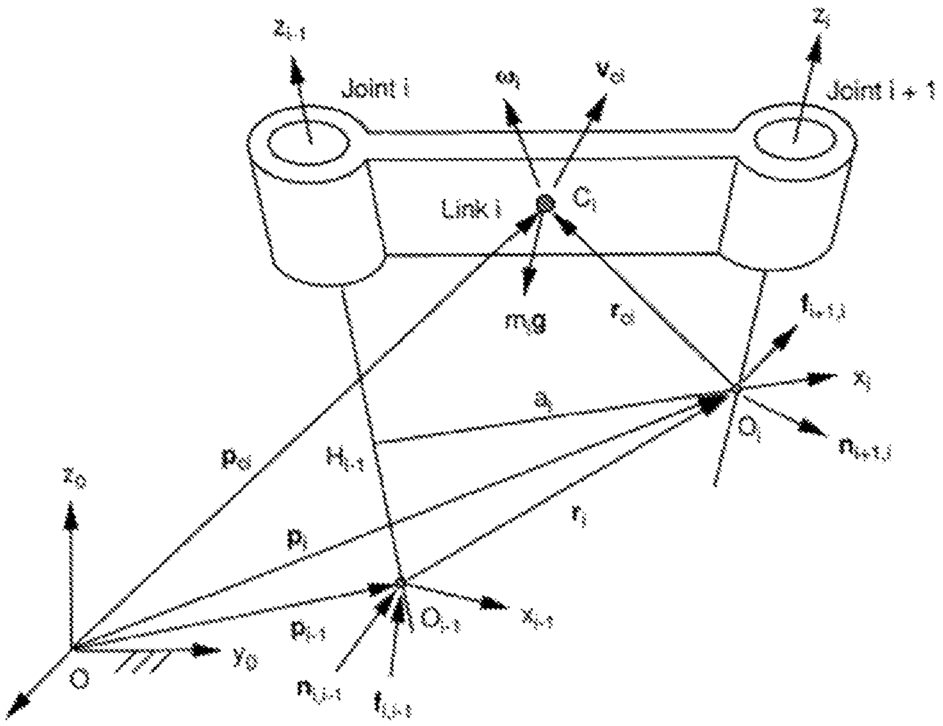
FIG. 5 is a schematic diagram of coordinate systems of a link according to an embodiment of the present disclosure.

For example, motion coordinate systems of each link may be established as shown in FIG. 5. In detail, a first coordinate system is established at a base of the robot with O as the origin. A second coordinate system is established at a joint i corresponding to a first end of a link i, and with $O_{i-1}$ as the origin. A third coordinate system is established at a joint i+1 corresponding to a second end of the link i, and with $O_i$ as the origin. The following forward recursive equations of the Recursive Newton-Euler Algorithm are established, and the motion state parameters of the link i can be determined according to the motion state parameters of a link i−1 in front of the link i.

The angular velocity $i_{\omega_i}$ of the link i is calculated according to the following equation:

$$ {}^{i}\omega_i = \begin{cases} {}^{i}R_{i-1}({}^{i-1}\omega_{i-1} + {}^{i-1}z_{i-1}\dot{\theta}_i) & \text{for a revolute joint} \\ {}^{i}R_{i-1}{}^{i-1}\omega_{i-1} & \text{for a linear driven joint} \end{cases} \tag{1} $$

The angular acceleration $i_{\dot{\omega}_i}$ of the link i is calculated according to the following equation:

$$ {}^{i}\dot{\omega}_i = \begin{cases} {}^{i}R_{i-1}({}^{i-1}\dot{\omega}_{i-1} + {}^{i-1}z_{i-1}\ddot{\theta}_i + {}^{i-1}\omega_{i-1} \times {}^{i-1}z_{i-1}\dot{\theta}_i) & \text{for a revolute joint} \\ {}^{i}R_{i-1}{}^{i-1}\dot{\omega}_{i-1} & \text{for a linear driven joint} \end{cases} \tag{2} $$

The linear velocity $i_{v_i}$ of the link i is calculated according to the following equation:

$$ {}^{i}v_i = \begin{cases} {}^{i}R_{i-1}{}^{i-1}v_{i-1} + {}^{i}\omega_i \times {}^{i}r_i & \text{for a revolute joint} \\ {}^{i}R_{i-1}({}^{i-1}v_{i-1} + {}^{i-1}z_{i-1}\dot{d}_i) + {}^{i}\omega_i \times {}^{i}r_i & \text{for a linear driven joint} \end{cases} \tag{3} $$

The linear acceleration $i_{\dot{v}_i}$ of the link i is calculated according to the following equation:

$$ {}^{i}\dot{v}_i = \begin{cases} {}^{i}R_{i-1}{}^{i-1}\dot{v}_{i-1} + {}^{i}\dot{\omega}_i \times {}^{i}r_i + {}^{i}\omega_i \times ({}^{i}\omega_i \times {}^{i}r_i) & \text{for a revolute joint} \\ {}^{i}R_{i-1}({}^{i-1}\dot{v}_{i-1} + {}^{i-1}z_{i-1}\ddot{d}_i) + {}^{i}\dot{\omega}_i \times {}^{i}r_i + {}^{i}\omega_i \times ({}^{i}\omega_i \times {}^{i}r_i) + 2\,{}^{i}\omega_i \times ({}^{i}R_{i-1}{}^{i-1}z_{i-1}\dot{d}_i) & \text{for a linear driven joint} \end{cases} \tag{4} $$

The linear acceleration of the center of mass of the link i is calculated according to the following equation:

$$^{i}\dot{v}_{ci} = {^{i}\dot{v}_i} + {^{i}\dot{\omega}_i} \times {^{i}r_{ci}} + {^{i}\omega_i} \times ({^{i}\omega_i} \times {^{i}r_{ci}}) \tag{5}$$

In the above equations (1)-(5), $R_{i-1}$ is a rotation transformation matrix from the coordinate system $O_{i-1}$ to the coordinate system $O_i$, $\omega_{i-1}$ is the angular velocity of the link i−1 in front of the link i, $z_{i-1}$ is a direction vector of a motion axis of the joint i, $\dot{\theta}_i$ and $\ddot{\theta}_i$ are respectively the joint angular velocity and the joint angular acceleration of the joint i, $v_{i-1}$ is the linear velocity of the link i−1 in front of the link i, $r_i$ is a vector connecting the origin $O_{i-1}$ of the second coordinate system and the origin $O_i$ of the third coordinate system, $\dot{d}_i$ and $\ddot{d}_i$ are respectively the linear velocity and the linear acceleration of the link i when the link i is in a linearly driven joint, $r_{ci}$ is a position vector of the center of mass. The left superscript of the vector indicates the reference coordinate system in which the vector is described (for example, the left superscript i indicates that the vector is described in the third coordinate system with $O_i$ as the origin). It should be understood that the description of the vector in different coordinate systems can be obtained according to the coordinate transformation relations between the coordinate systems.

In the above equations (1)-(5), the equations for the revolute joint correspond to a case that the two links are rotatably connected by the joint. The equations for the linear driven joint correspond to a case that the two links are connected linearly by the joint that allows the two links to move linearly.

It should be understood by those skilled in the art that the Recursive Newton-Euler equations may have different transformations, which are not shown in the embodiments of the present disclosure, but these transformations in accordance with the principle and spirit of the present disclosure.

At step S3, an inertial force and an inertial torque at the center of mass of a target link are determined according to the motion state parameters and the inertial property parameters of each link.

In detail, in some embodiments, the inertial force and the inertial torque at the center of mass of the target link are determined according to the motion state parameters and the inertial property parameters of each link by using backward recursive equations of the Recursive Newton-Euler equations.

For example, the inertial force and the inertial torque at the center of mass of the target link may be determined according to the following backward recursive equations of the Recursive Newton-Euler equations:

$$^{i}f_i^* \equiv -m_i {^{i}\dot{v}_{ci}} \tag{6}$$

$$^{i}n_i^* \equiv -{^{i}I_i}{^{i}\dot{\omega}_i} - {^{i}\omega_i} \times ({^{i}I_i}{^{i}\omega_i}) \tag{7}$$

$$^{i}f_{i,i-1} = {^{i}f_{i+1,i}} - m_i {^{i}g} - {^{i}f_i^*} \tag{8}$$

$$^{i}n_{i,i-1} = {^{i}n_{i+1,i}} + ({^{i}r_i} + {^{i}r_{ci}}) \times {^{i}f_{i,i-1}} - {^{i}r_{ci}} \times {^{i}f_{i+1,i}} - {^{i}n_i^*} \tag{9}$$

In the above equations, $$f_i^*$$

is the inertial force of the link i at the center of mass, $m_i$ is the mass of the link i, $\dot{v}_{ci}$ is the linear acceleration of the link i at the center of mass, $I_i$ is a rotational inertia matrix of the link i to the center of mass, $$n_i^*$$

is the inertial torque of the link i at the center of mass, $f_{i,i-1}$ is the force that the link i−1 in front of the link i applies to the link i at the point $O_{i-1}$, which is obtained according to the dynamics principle, and $n_{i,i-1}$ is the combined torque that the link i−1 in front of the link i applies to the link i at the point $O_{i-1}$, which is obtained according to the dynamics principle. It should be understood that the expression of the vectors in different coordinate systems can be obtained according to coordinate transformation relations between the coordinate systems.

It should be understood by those of ordinary skill in the art that the foregoing equations (1)-(9) uses the third coordinate system as the reference coordinate system. If the second coordinate system or another coordinate system is used as the reference coordinate system, corresponding coordinate system transformation is required for the equations with the same principle and spirit in essence.

At step S4, forces and torques between the two ends of the target link and the corresponding joints are acquired respectively by the 6-DOF force and torque sensors.

In detail, the forces and the torques between the two ends of the target link and the corresponding joints are acquired by the 6-DOF force and torque sensors mounted on the joints at the two ends of the target link, respectively. It should be understood that the measured values of the 6-DOF force and torque sensors mounted on the joints can represent the actual measured values of the forces and the torques on the two links adjacent to the joint. Thus, the measured values of the forces applied on the target link by the links in front of and behind the target link can be obtained in this step.

At step S5, an external force applied to the target link is determined according to the inertial force and the inertial torque at the center of mass of the target link, and the forces and the torques between the two ends of the target link and the corresponding joints.

In some embodiments, the step of determining the external force applied to the target link according to the inertial force and the inertial torque at the center of mass of the target link, and the forces and the torques between the two ends of the target link and the corresponding joints includes: determining a first difference between the inertial force at the center of mass of the target link and the forces between the two ends of the target link and the corresponding joints, and determining a magnitude and a direction of the external force applied to the target link according to the first difference. The first difference is a vector difference.

Figure 6:
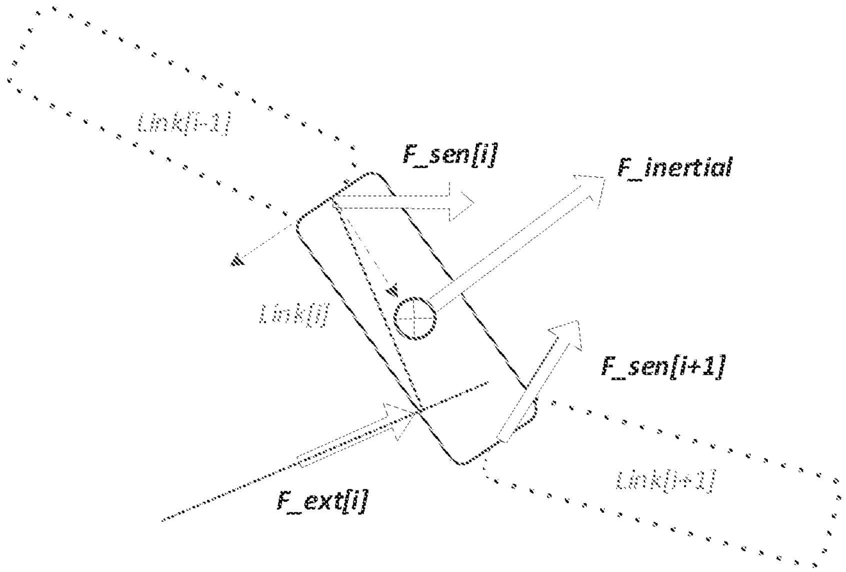
FIG. 6 is a schematic diagram showing forces applied to a link according to an embodiment of the present disclosure.

The principle of determining the magnitude and the direction of the external force applied to the target link according to the first difference will be illustrated below with reference to FIG. 6. As shown in FIG. 6, the inertial force $F_{inertial}[i]$ of the target link at the center of mass is equal to the sum of the forces $F_{sen}[i]$ and $F_{sen}[i+1]$ between the two ends of the target link and the corresponding joints (i.e., the forces detected by the 6-DOF force and torque sensors mounted on the corresponding joints at the two ends of the target link) and the external force $F_{ext}[i]$ applied to the target link, i.e., $$F_{inertial}[i] = m_i\dot{v}_i = F_{sen}[i] + F_{sen}[i+1] + F_{ext}[i] \quad (10)$$

Since the inertial force $F_{inertial}[i]$ of the target link at the center of mass has been calculated at the step S3, the magnitude and the direction of the external force applied to the target link can be deduced as:

$$F_{ext}[i] = m_i\dot{v}_i - F_{sen}[i] - F_{sen}[i+1] \quad (11)$$

In other words, the vector of the external force $F_{ext}[i]$ applied to the target link is equal to the difference between the vector of the inertial force $m_i\dot{v}_i$ at the center of mass of the target link and the forces $F_{sen}[i]$ and $F_{sen}[i+1]$ between the two ends of the target link and the corresponding joints, i.e., the first difference. The first difference is a vector difference. Therefore, the magnitude and the direction of the external force applied to each target link can be calculated.

Furthermore, after determining the magnitude and the direction of the external force, a specific location of the external force applied to each of the target links may also be calculated in the embodiments of the present disclosure. In some embodiments, determining the specific location of the external force applied to the target link includes the following steps. A net torque of the target link at a reference point is determined according to a second difference between the torques between the two ends of the target link and the corresponding joints and the inertial torque of the target link at the center of mass. Then, the location of the external force applied to the target link relative to the reference point is determined according to the net torque of the target link at the reference point, and the magnitude and the direction of the external force applied to the target link.

The reference point may be any point in a space where the robotic arm is located. The reference point may be selected according to actual needs. In some embodiments, the location of the reference point may be the origin of the coordinate system corresponding to the joint at one end of the target link. In other embodiments, the location of the reference point may be the center of mass of the target link.

In detail, the location of the external force applied to the target link relative to the reference point can be calculated according to the following equations.

$$r_{mag} = \frac{\|M\|}{\|F\|} \quad (12)$$

$$r_{vec} = r_{mag}\frac{F \times M}{\|F \times M\|} \quad (13)$$

In the above equations, $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

Furthermore, before determining the location of the external force applied to the target link relative to the reference point according to the net torque of the target link at the reference point and the magnitude and the direction of the external force applied to the target link, the method may further include the following steps. It is determined that whether the magnitude of the external force is greater than a predetermined first threshold value, and whether a value of the net torque is greater than a predetermined second threshold value. If the magnitude of the external force is less than the first threshold value, it is determined that there is no external force applied to the target link. If the magnitude of the external force is greater than or equal to the first threshold value and the value of the net torque is less than the second threshold value, it is determined that the external force applied to the target link is located at the reference point. If the magnitude of the external force is greater than or equal to the first threshold value and the value of the net torque is greater than the second threshold, the location of the external force applied to the target link relative to the reference point is determined according to the net torque of the target link at the reference point and the magnitude and the direction of the external force applied to the target link using the equation (12) and equation (13) as described above.

In the method for determining the external force applied to the robotic arm in the embodiments of the present disclosure, by providing the 6-DOF force and torque sensors on the joints to detect the forces and the torques applied to the joints in each direction, and combining with the calculated inertial force and inertial torque of the target link at the center of mass, the magnitude, the direction and the location of the external force applied to each target link can be calculated, making the detection of the external force applied to the robotic arm more accurate.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Figure 7:
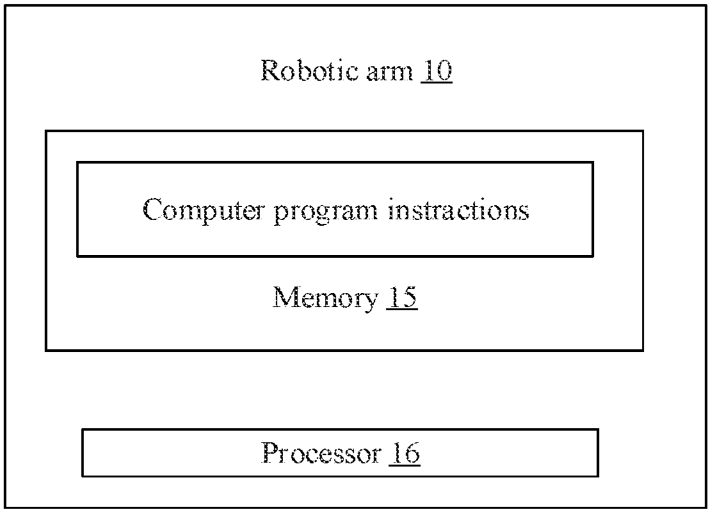
FIG. 7 is a schematic block diagram of a structure of a robotic arm according to an embodiment of the present disclosure.

Based on the same concept, another aspect of the present disclosure further provides a robotic arm. Referring to FIG. 1 and FIG. 7, the robotic arm 10 includes a plurality of links, a plurality of joints and an operating portion. The links are connected by the joints. The links may be rotatably connected by the joints, or part of the links may be connected by the joints in a linearly driven manner. The operating portion may be a component such as a gripper for implementing the corresponding function of the robotic arm. A 6-DOF force and torque sensor 14 is mounted on the joint 12 at each end of at least part of the links 11 to detect the forces and the torques applied to the corresponding joint. The robotic arm 10 further includes at least one memory 15 and at least one processor 16. The at least one memory 15 stores computer program instructions. When the computer program instructions are executed by the at least one processor, the following steps of the method for determining the external force applied to the robotic arm are implemented. Inertial property parameters of each link are acquired. The inertial property parameters include a mass, a center of mass, and a rotational inertia of each link. Motion state parameters of each link are determined. The motion state parameters include an angular velocity, an angular acceleration, and a linear acceleration of each link. An inertial force and an inertial torque at the center of mass of a target link are determined according to the motion state parameters and the inertial property parameters of each link. Forces and torques between the two ends of the target link and the corresponding joints are acquired by the 6-DOF force and torque sensors. An external force applied to the target link is determined according to the inertial force and the inertial torque at the center of mass of the target link, and the forces and the torques between the two ends of the target link and the corresponding joints.

In some embodiments, the step of determining the motion state parameters of each link includes the following steps. Connection parameters of each joint and angular information of each joint are acquired. The connection parameters represent a spatial position relationship of two adjacent links. The angular information of each joint includes a joint angular position, a joint angular velocity, and a joint angular acceleration. According to the inertial property parameters of each link, the connection parameters of each joint, and the angular information of each joint, the motion state parameters of each link are determined using the robot dynamics principle.

In some other embodiments, an inertial measurement unit is mounted on each of the links for measuring the angular velocity, the angular acceleration, and the linear acceleration of the corresponding link. The step of determining the motion state parameters of each link includes: obtaining the motion state parameters of each link from the inertial measurement units.

In some embodiments, the step of determining the inertial force and the inertial torque at the center of mass of the target link according to the motion state parameters and the inertial property parameters of each link includes: determining the inertial force and the inertial torque at the center of mass of the target link according to the motion state parameters and the inertial property parameters of each link by using the backward recursive equations of the Recursive Newton-Euler equations. The specific determining method can be referred to the aforementioned embodiments and will not be repeated here.

In some embodiments, the step of determining the external force applied to the target link according to the inertial force and the inertial torque at the center of mass of the target link, and the forces and the torques between the two ends of the target link and the corresponding joints includes: determining a first difference between the inertial force at the center of mass of the target link and the forces between the two ends of the target link and the corresponding joints, and determining a magnitude and a direction of the external force applied to the target link according to the first difference. The first difference is a vector difference.

In some embodiments, the method further includes the following steps. A net torque of the target link at a reference point is determined according to a second difference between the torques between the two ends of the target link and the corresponding joints and the inertial torque of the target link at the center of mass. Then, the location of the external force applied to the target link relative to the reference point is determined according to the net torque of the target link at the reference point and the magnitude and the direction of the external force applied to the target link.

In some embodiments, before determining the location of the external force applied to the target link relative to the reference point according to the net torque of the target link at the reference point and the magnitude and the direction of the external force applied to the target link, the method may further include the following steps. It is determined that whether the magnitude of the external force is greater than a predetermined first threshold value, and whether a value of the net torque is greater than a predetermined second threshold value. If the magnitude of the external force is less than the first threshold value, it is determined that there is no external force applied to the target link. If the magnitude of the external force is greater than or equal to the first threshold value and the value of the net torque is less than the second threshold value, it is determined that the external force applied to the target link is located at the reference point. If the magnitude of the external force is greater than or equal to the first threshold value and the value of the net torque is greater than the second threshold, the location of the external force applied to the target link relative to the reference point is determined according to the net torque of the target link at the reference point and the magnitude and the direction of the external force applied to the target link according to the following equations:

$$r_{mag} = \frac{\|M\|}{\|F\|}$$

$$r_{vec} = r_{mag}\frac{F \times M}{\|F \times M\|}$$

In the above equations, $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

Another aspect of the present disclosure further provides a non-transitory computer-readable storage medium, which stores computer program instructions. When the computer program instructions are executed by at least one processor, the method for determining the external force applied to the robotic arm in one or more of the previously described embodiments are implemented.

Those of ordinary skill in the art can understand that all or part of the processes in the methods of the above embodiments can be implemented by instructing relevant hardware through a computer program, and the computer program can be stored in a non-volatile computer-readable storage medium, when the computer program is executed, it can implement the processes of the above-mentioned method embodiments. Any reference to a memory, a storage, a database or other media used in the embodiments provided in this disclosure may include at least one of a non-transitory and a volatile memory. The non-transitory memory may include a read-only memory (ROM), a magnetic tape, a floppy disk, a flash memory, an optical memory, a high-density embedded non-transitory memory, a resistive memory (ReRAM), a Magnetoresistive Random Access Memory (MRAM), a Ferroelectric Random Access Memory (FRAM), a Phase Change Memory (PCM), or a graphene memory, etc. The Volatile memory may include a random access memory (RAM) or an external cache memory. By way of illustration and not limitation, the RAM may be in various forms, such as a static random access memory (SRAM) or a dynamic random access memory (DRAM), etc.

The technical features in the above embodiments may be randomly combined. In order to make the description concise, not all possible combinations of the technical features in the above embodiments are described. However, all the combinations of the technical features are to be considered as falling within the scope described in this specification provided that they do not conflict with each other.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. A method for determining an external force applied to a robotic arm, the robotic arm comprising a plurality of links connected in sequence and a plurality of joints, the links being connected by the joints, a six degrees of freedom (6-DOF) force and torque sensor being mounted on the joint at each end of at least part of the links, the 6-DOF force and torque sensor being configured to detect forces and torques applied to the corresponding joint, wherein the method comprises:

acquiring inertial property parameters of each link, the inertial property parameters comprising a mass, a center of mass, and a rotational inertia of each link;

determining motion state parameters of each link, the motion state parameters comprising an angular velocity, an angular acceleration, and a linear acceleration of each link;

determining an inertial force and an inertial torque at the center of mass of a target link according to the motion state parameters and the inertial property parameters of each link;

acquiring forces and torques between two ends of the target link and the corresponding joints respectively by the 6-DOF force and torque sensors;

determining an external force applied to the target link according to the inertial force and the inertial torque at the center of mass of the target link, and the forces and the torques between the two ends of the target link and the corresponding joints; and controlling the robot by utilizing the determined external force data;

wherein determining an external force applied to the target link according to the inertial force and the inertial torque at the center of mass of the target link, and the forces and the torques between the two ends of the target link and the corresponding joints comprises:

determining a first difference between the inertial force at the center of mass of the target link and the forces between the two ends of the target link and the corresponding joints;

determining a magnitude and a direction of the external force applied to the target link according to the first difference;

determining a net torque of the target link at a reference point according to a second difference between the torques between the two ends of the target link and the corresponding joints and the inertial torque of the target link at the center of mass; and determining a location of the external force applied to the target link relative to the reference point according to the net torque of the target link at the reference point, and the magnitude and the direction of the external force applied to the target link.

2. The method according to claim 1, wherein the determining the motion state parameters of each link comprises:

acquiring connection parameters of each joint and acquiring angular information of each joint, the connection parameters representing a spatial position relationship of two adjacent links, and the angular information of each joint comprising a joint angular position, a joint angular velocity, and a joint angular acceleration; and according to the inertial property parameters of each link, the connection parameters of each joint, and the angular information of each joint, determining the motion state parameters of each link using a robot dynamics principle.

3. The method according to claim 1, wherein an inertial measurement unit is mounted on each of the links for measuring the angular velocity, the angular acceleration, and the linear acceleration of a corresponding link, the determining the motion state parameters of each link comprises:

obtaining the motion state parameters of each link from the inertial measurement units.

4. The method according to claim 1, wherein the determining the inertial force and the inertial torque at the center of mass of the target link according to the motion state parameters and the inertial property parameters of each link comprises:

determining the inertial force and the inertial torque at the center of mass of the target link according to the motion state parameters and the inertial property parameters of each link by using backward recursive equations of Recursive Newton-Euler equations.

5. The method according to claim 1, wherein before determining the location of the external force applied to the target link relative to the reference point according to the net torque of the target link at the reference point, and the magnitude and the direction of the external force applied to the target link, the method further comprises:

determining whether the magnitude of the external force is greater than a predetermined first threshold value, and determining whether a value of the net torque is greater than a predetermined second threshold value;

determining that there is no external force applied to the target link if the magnitude of the external force is less than the first threshold value; and determining that the external force applied to the target link is located at the reference point if the magnitude of the external force is greater than or equal to the first threshold value and the value of the net torque is less than the second threshold value.

6. The method according to claim 5, further comprising determining the location of the external force applied to the target link relative to the reference point according to following equations if the magnitude of the external force is greater than or equal to the first threshold value and the value of the net torque is greater than the second threshold:

$$r_{mag} = \frac{\|M\|}{\|F\|}$$

$$r_{vec} = r_{mag}\frac{F \times M}{\|F \times M\|}$$

wherein $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

7. A robotic arm, comprising:

a plurality of links connected in sequence;

a plurality of joints, the links being connected by the joints;

a plurality of six degrees of freedom (6-DOF) force and torque sensors being mounted on the joints at two ends of at least part of the links, the 6-DOF force and torque sensors being configured to detect forces and torques applied to corresponding joints;

at least one memory storing computer program instructions; and at least one processor, wherein when the computer program instructions are executed by the at least one processor, following steps are implemented:

acquiring inertial property parameters of each link, the inertial property parameters comprising a mass, a center of mass, and a rotational inertia of each link;

determining motion state parameters of each link, the motion state parameters comprising an angular velocity, an angular acceleration, and a linear acceleration of each link;

determining an inertial force and an inertial torque at the center of mass of a target link according to the motion state parameters and the inertial property parameters of each link;

acquiring forces and torques between two ends of the target link and the corresponding joints respectively by the 6-DOF force and torque sensors;

determining an external force applied to the target link according to the inertial force and the inertial torque at the center of mass of the target link, and the forces and the torques between the two ends of the target link and the corresponding joints; and controlling the robot by utilizing the determined external force data;

wherein determining an external force applied to the target link according to the inertial force and the inertial torque at the center of mass of the target link, and the forces and the torques between the two ends of the target link and the corresponding joints comprises:

determining a first difference between the inertial force at the center of mass of the target link and the forces between the two ends of the target link and the corresponding joints;

determining a magnitude and a direction of the external force applied to the target link according to the first difference;

determining a net torque of the target link at a reference point according to a second difference between the torques between the two ends of the target link and the corresponding joints and the inertial torque of the target link at the center of mass; and determining a location of the external force applied to the target link relative to the reference point according to the net torque of the target link at the reference point, and the magnitude and the direction of the external force applied to the target link.

8. The robotic arm according to claim 7, wherein the determining the motion state parameters of each link comprises:

acquiring connection parameters of each joint and acquiring angular information of each joint, the connection parameters representing a spatial position relationship of two adjacent links, and the angular information of each joint comprising a joint angular position, a joint angular velocity, and a joint angular acceleration; and according to the inertial property parameters of each link, the connection parameters of each joint, and the angular information of each joint, determining the motion state parameters of each link using a robot dynamics principle.

9. The robotic arm according to claim 7, wherein an inertial measurement unit is mounted on each of the links for measuring the angular velocity, the angular acceleration, and the linear acceleration of a corresponding link, the determining the motion state parameters of each link comprises:

obtaining the motion state parameters of each link from the inertial measurement units.

10. The robotic arm according to claim 7, wherein the determining the inertial force and the inertial torque at the center of mass of the target link according to the motion state parameters and the inertial property parameters of each link comprises:

determining the inertial force and the inertial torque at the center of mass of the target link according to the motion state parameters and the inertial property parameters of each link by using backward recursive equations of Recursive Newton-Euler equations.

11. The robotic arm according to claim 7, before determining the location of the external force applied to the target link relative to the reference point according to the net torque of the target link at the reference point, and the magnitude and the direction of the external force applied to the target link, the steps further comprise:

determining whether the magnitude of the external force is greater than a predetermined first threshold value, and determining whether a value of the net torque is greater than a predetermined second threshold value;

determining that there is no external force applied to the target link if the magnitude of the external force is less than the first threshold value; and determining that the external force applied to the target link is located at the reference point if the magnitude of the external force is greater than or equal to the first threshold value and the value of the net torque is less than the second threshold value.

12. The robotic arm according to claim 11, the steps further comprising determining the location of the external force applied to the target link relative to the reference point according to following equations if the magnitude of the external force is greater than or equal to the first threshold value and the value of the net torque is greater than the second threshold:

$$r_{mag} = \frac{\|M\|}{\|F\|}$$

$$r_{vec} = r_{mag}\frac{F \times M}{\|F \times M\|}$$

wherein $r_{mag}$ is a shortest distance from the reference point to an action line of the external force applied to the target link, $r_{vec}$ is a shortest vector from the reference point to the action line of the external force applied to the target link, M is the net torque, and F reflects the magnitude and the direction of the external force applied to the target link.

13. A non-transitory computer-readable storage medium, on which computer program instruction are stored, wherein when the computer program instructions are executed by at least one processor, following steps are implemented:

acquiring inertial property parameters of each link, the inertial property parameters comprising a mass, a center of mass, and a rotational inertia of each link;

determining motion state parameters of each link, the motion state parameters comprising an angular velocity, an angular acceleration, and a linear acceleration of each link;

determining an inertial force and an inertial torque at the center of mass of a target link according to the motion state parameters and the inertial property parameters of each link;

acquiring forces and torques between two ends of the target link and the corresponding joints respectively by the 6-DOF force and torque sensors;

determining an external force applied to the target link according to the inertial force and the inertial torque at the center of mass of the target link, and the forces and the torques between the two ends of the target link and the corresponding joints;

controlling the robot by utilizing the determined external force data;

wherein determining an external force applied to the target link according to the inertial force and the inertial torque at the center of mass of the target link, and the forces and the torques between the two ends of the target link and the corresponding joints comprises:

determining a first difference between the inertial force at the center of mass of the target link and the forces between the two ends of the target link and the corresponding joints;

determining a magnitude and a direction of the external force applied to the target link according to the first difference;

determining a net torque of the target link at a reference point according to a second difference between the torques between the two ends of the target link and the corresponding joints and the inertial torque of the target link at the center of mass; and determining a location of the external force applied to the target link relative to the reference point according to the net torque of the target link at the reference point, and the magnitude and the direction of the external force applied to the target link.

14. The non-transitory computer-readable storage medium according to claim 13, wherein the determining the motion state parameters of each link comprises:

acquiring connection parameters of each joint and acquiring angular information of each joint, the connection parameters representing a spatial position relationship of two adjacent links, and the angular information of each joint comprising a joint angular position, a joint angular velocity, and a joint angular acceleration; and according to the inertial property parameters of each link, the connection parameters of each joint, and the angular information of each joint, determining the motion state parameters of each link using a robot dynamics principle.

* * * * *